(12) United States Patent
Courtright

(10) Patent No.: US 12,157,179 B1
(45) Date of Patent: Dec. 3, 2024

(54) BOBBIN FRICTION STIR WELD ADDITIVE MANUFACTURING SYSTEM AND METHOD

(71) Applicant: United States of America as represented by the Administrator of NASA, Washington, DC (US)

(72) Inventor: Zachary Stephen Courtright, Madison, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 12 days.

(21) Appl. No.: 18/351,266

(22) Filed: Jul. 12, 2023

(51) Int. Cl.
*B23K 20/12* (2006.01)
*B33Y 10/00* (2015.01)
*B33Y 30/00* (2015.01)

(52) U.S. Cl.
CPC ...... *B23K 20/1215* (2013.01); *B23K 20/1225* (2013.01); *B23K 20/125* (2013.01); *B23K 20/1255* (2013.01); *B33Y 10/00* (2014.12); *B33Y 30/00* (2014.12)

(58) Field of Classification Search
CPC ...... B23K 20/1215; B23K 20/122–128; B33Y 10/00; B33Y 30/00
USPC ............................................. 228/112.1, 2.1
See application file for complete search history.

(56) References Cited

U.S. PATENT DOCUMENTS

| | | | |
|---|---|---|---|
| 6,543,671 B2 | 4/2003 | Hatten et al. | |
| 6,638,381 B2 | 10/2003 | Keener et al. | |
| 8,397,974 B2 | 3/2013 | Schultz et al. | |
| 2006/0289603 A1 | 12/2006 | Zettler et al. | |
| 2012/0006086 A1 | 1/2012 | Manchiraju et al. | |
| 2012/0009339 A1* | 1/2012 | Creehan | B23K 20/1245 427/180 |
| 2012/0279441 A1* | 11/2012 | Creehan | C23C 26/00 228/2.1 |
| 2012/0279442 A1* | 11/2012 | Creehan | C23C 26/00 228/2.1 |
| 2015/0165546 A1 | 6/2015 | Kandasamy et al. | |
| 2016/0175981 A1 | 6/2016 | Kandasamy | |
| 2016/0175982 A1* | 6/2016 | Kandasamy | B23K 20/1245 228/114.5 |
| 2018/0085849 A1* | 3/2018 | Kandasamy | B23K 20/129 |
| 2020/0047279 A1 | 2/2020 | Misak | |
| 2021/0046579 A1 | 2/2021 | Rodriguez et al. | |

(Continued)

FOREIGN PATENT DOCUMENTS

CN 105026096 B * 11/2017 ........... B23K 20/122
CN 114131176 A * 3/2022

(Continued)

*Primary Examiner* — Kiley S Stoner
(74) *Attorney, Agent, or Firm* — Jerry L. Seemann; Trenton J. Roche

(57) ABSTRACT

Additive manufacturing systems and methods are disclosed. A housing includes a passageway having first and second open ends. A material is fed through the passageway and exits its second open end. A friction stir weld (FSW) bobbin pin tool is mounted in the housing with a radial edge of the pin tool's annular volume disposed adjacent to the second open end of the passageway. The annular volume is adapted to receive a substrate. The FSW bobbin pin tool is operable to be rotated so that the substrate and the material exiting the second open end of the passageway are plasticized in the annular volume for deposition onto the substrate.

22 Claims, 9 Drawing Sheets

(56) References Cited

U.S. PATENT DOCUMENTS

| | | |
|---|---|---|
| 2021/0053283 A1* | 2/2021 | Liu .................. B29C 48/06 |
| 2021/0146471 A1 | 5/2021 | Rodriguez et al. |
| 2021/0205916 A1 | 7/2021 | Senderos et al. |
| 2022/0281005 A1* | 9/2022 | Kandasamy .......... B21C 23/002 |
| 2024/0100624 A1* | 3/2024 | Hardwick ............ B23K 20/124 |

FOREIGN PATENT DOCUMENTS

| | | | |
|---|---|---|---|
| JP | 2005152909 A * | 6/2005 | |
| WO | WO-2013076472 A1 * | 5/2013 | .......... B23K 20/122 |
| WO | WO-2018038326 A1 * | 3/2018 | |
| WO | WO-2022032061 A1 * | 2/2022 | ............. B22F 10/80 |

* cited by examiner

BOBBIN FRICTION STIR WELD ADDITIVE MANUFACTURING SYSTEM AND METHOD

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

This disclosure relates to additive manufacturing. More specifically, the disclosure presents additive manufacturing systems and methods using a bobbin friction stir weld tool.

2. Description of the Related Art

The fabrication of large metal (e.g., aluminum alloys, titanium alloys, steel, etc.) structures including, for example, aircraft fuselages, rocket core stages, etc., currently requires extensive processing, which may consist of machining via orthogrid, bump forming, welding gore segments together, and circumferentially welding cylindrical sections to each other and to cylindrical-section-terminating domes. Fabricating large cylindrical structures in this fashion is time consuming. Furthermore, a final product fabricated in this fashion may have many flaws owing to the required number of logistical moves, touch points, and processing development cycles.

SUMMARY OF THE INVENTION

Accordingly, it is an object of the present disclosure to describe methods and systems for improving the fabrication of large structures.

Another object of the present disclosure is to describe methods and systems for improving the fabrication of metal cylinders and domes.

Other objects and advantages of the methods and systems described herein will become more obvious hereinafter in the specification and drawings.

In accordance with the present disclosure, an additive manufacturing system includes a housing having a passageway extending through a portion of the housing. The passageway has a first open end and a second open end. The first open end is adapted to receive a material that is to be fed through the passageway and exit its second open end. The system also includes a friction stir weld (FSW) bobbin pin tool with a first shoulder, a second shoulder spaced apart from the first shoulder, and a pin having a longitudinal axis. The pin is rigidly coupled to the first shoulder and second shoulder wherein an annular volume is bounded by the first shoulder, the second shoulder, and the pin. The FSW bobbin pin tool is mounted in the housing with a radial edge of the annular volume disposed adjacent to the second open end of the passageway. The annular volume is adapted to receive a substrate. The FSW bobbin pin tool is operable to be rotated wherein the first shoulder, second shoulder, and pin rotate in unison and about the longitudinal axis of the pin. The substrate and the material exiting the second open end of the passageway are plasticized in the annular volume.

In accordance with the present disclosure, the additive manufacturing system may be used in an additive manufacturing process that includes positioning the housing adjacent to a substrate with an edge portion of the substrate disposed in the annular volume. The FSW bobbin pin tool is rotated as the housing and FSW bobbin pin tool are driven towards the edge portion of the substrate so that the pin is plunged into the edge portion of the substrate disposed in the annular volume where the edge portion of the substrate disposed in the annular volume is plasticized in the annular volume. Relative movement is generated between the FSW bobbin tool and the edge portion of the substrate as the FSW bobbin pin tool is rotated and driven into, and subsequently along, the edge portion of the substrate as a material is simultaneously fed through the passageway from the first open end. As the material exits the second open end, it is plasticized in the annular volume where the material so-plasticized mixes with the edge portion of the substrate so-plasticized. The mixture of the material so-plasticized and the edge portion of the substrate so-plasticized is deposited onto the substrate at the edge portion of the substrate.

BRIEF DESCRIPTION OF THE DRAWING(S)

Other objects, features and advantages of the methods and systems described herein will become apparent upon reference to the following description of the preferred embodiments and to the drawings, wherein corresponding reference characters indicate corresponding parts throughout the several views of the drawings and wherein.

Figure 5:
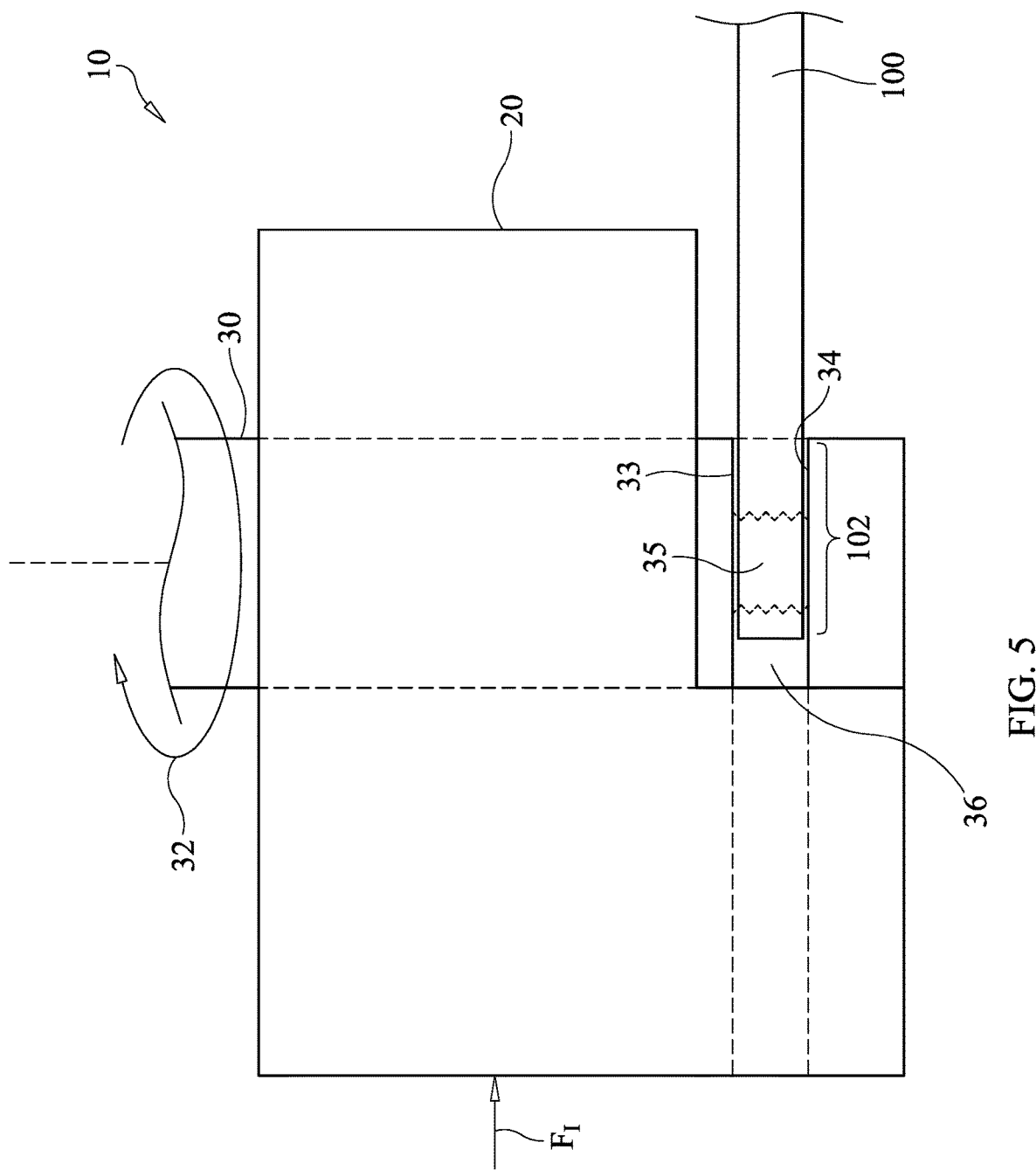
FIG. 5 is a side view of the additive manufacturing system illustrated in FIG. 4 engaging the edge portion of the substrate as the system is driven towards and along the substrate's edge portion while the FSW bobbin pin tool is rotated in accordance with various aspects as described herein.
Figure 8:
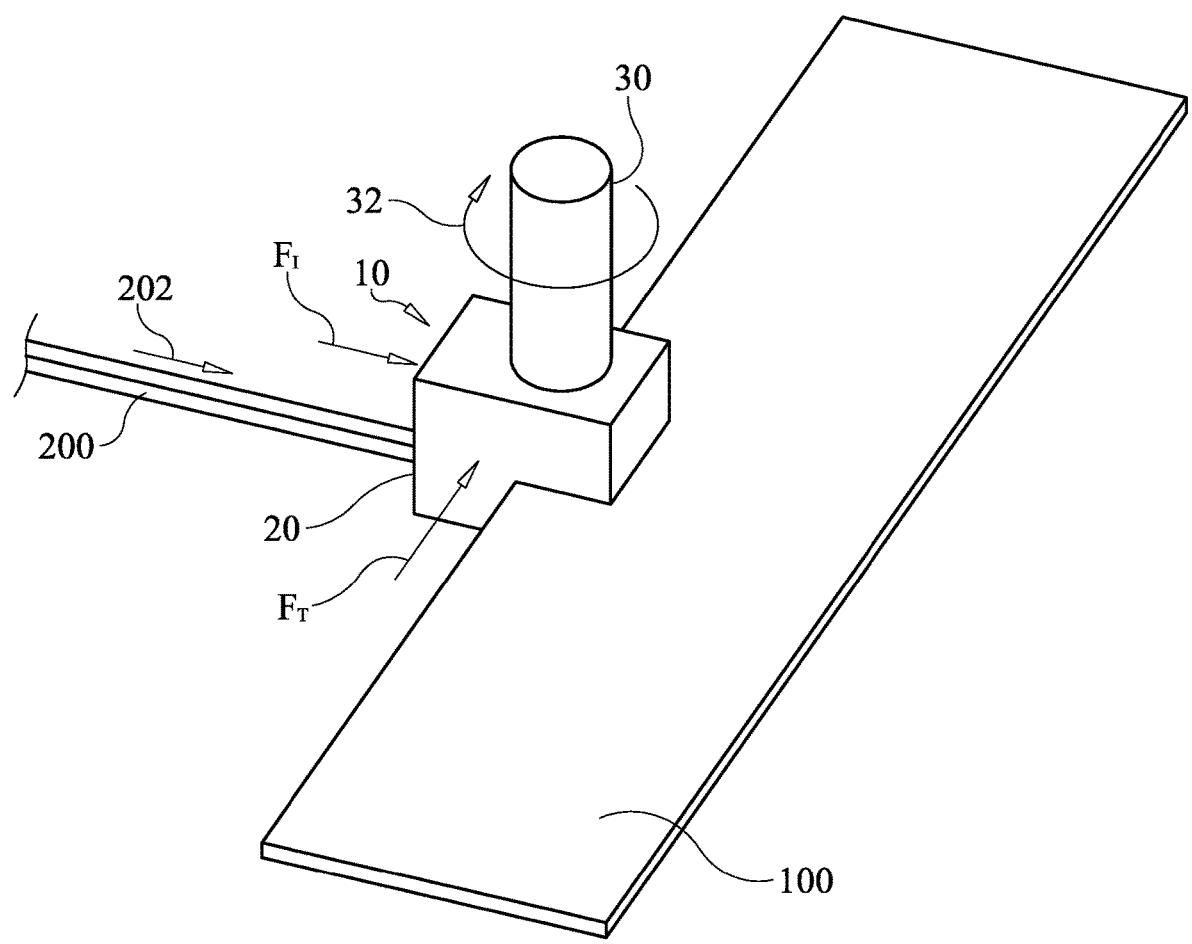
Figure 9:
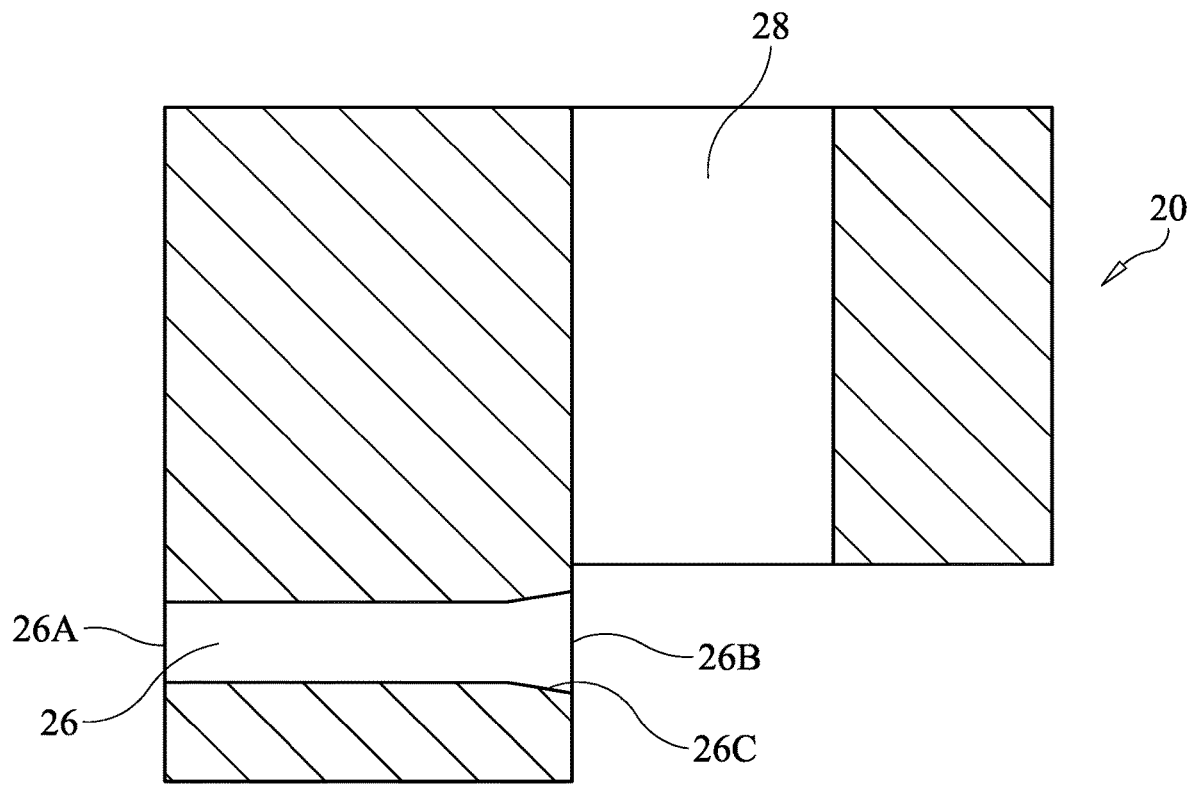
Figure 10:
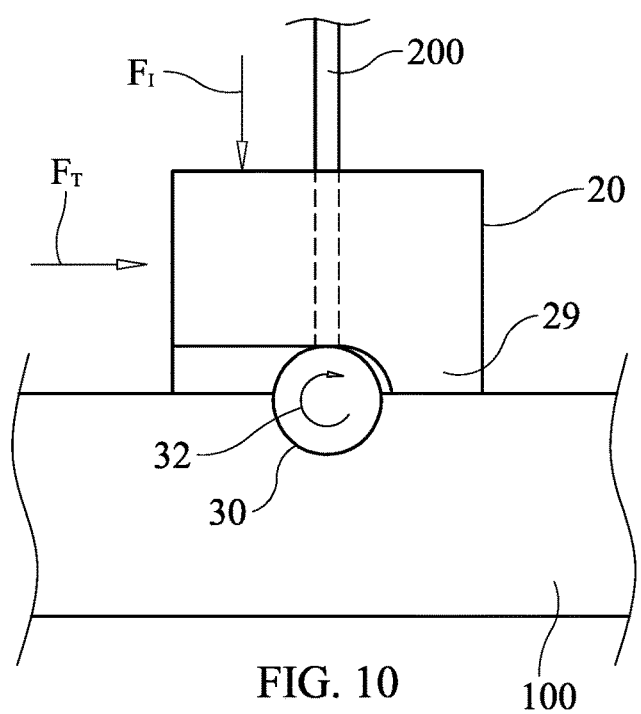

FIG. 8 is a perspective view of the additive manufacturing system illustrated in FIG. 5 engaging the edge portion of the substrate as the system is driven towards and along the substrate's edge portion while the FSW bobbin pin tool is rotated and as the system is being fed with a material that is to be deposited on the edge portion of the substrate in accordance with various aspects as described herein;

FIG. 9 is an isolated cross-sectional view of another embodiment of a deposition control housing for use in an additive manufacturing system in accordance with various aspects as described herein; and FIG. 10 is a bottom plan view of another embodiment of an additive manufacturing system engaging the edge portion of a substrate as the system moves along the substrate's edge portion while the FSW bobbin pin tool is rotated and as the system is being fed with a material that is to be deposited on the edge portion of the substrate in accordance with various aspects as described herein.

DESCRIPTION OF THE PREFERRED EMBODIMENT(S)

Figure 1:
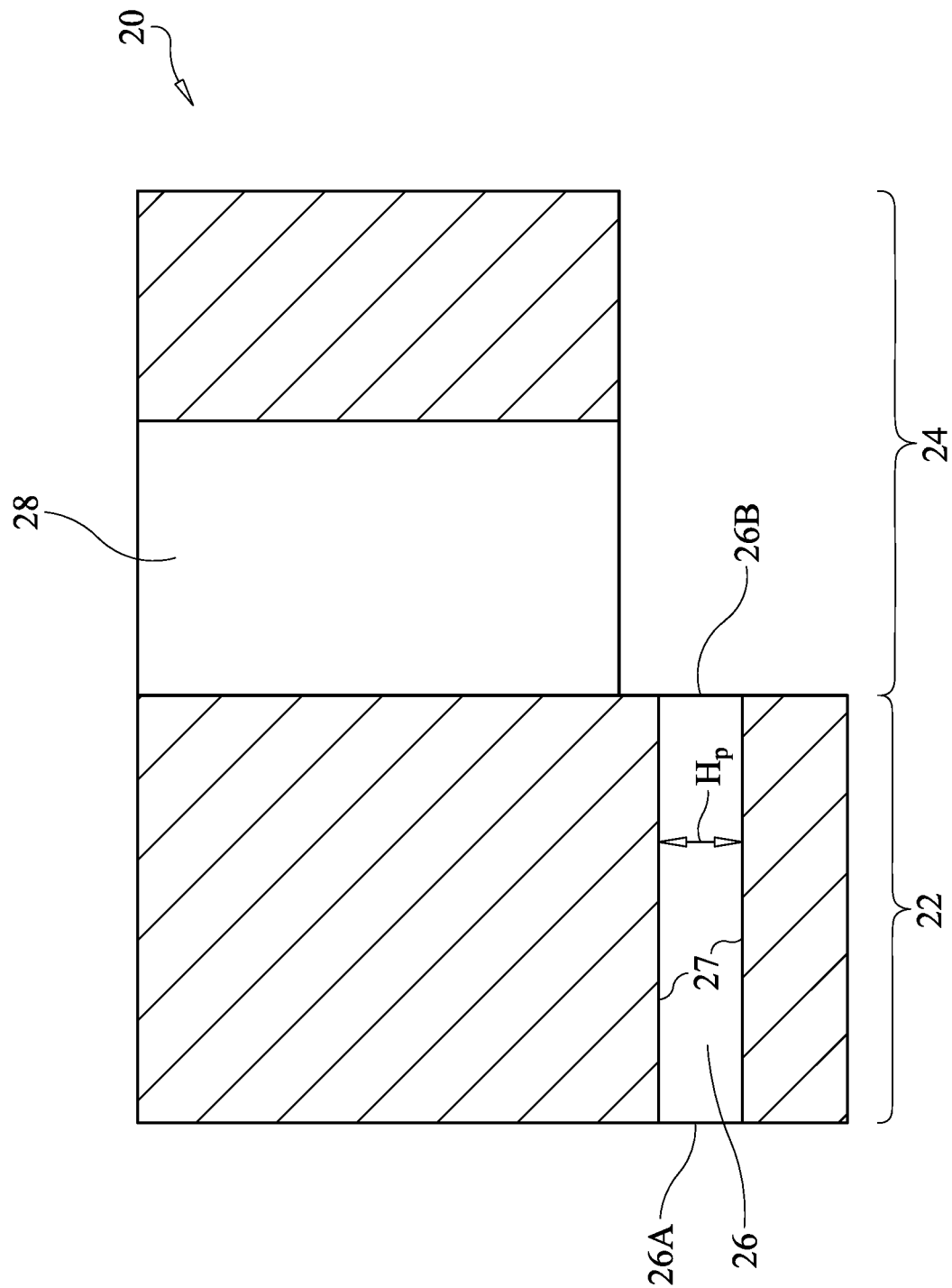
FIG. 1 is an isolated cross-sectional view of one embodiment of a deposition control housing for use in an additive manufacturing system in accordance with various aspects as described herein.
Figure 2:
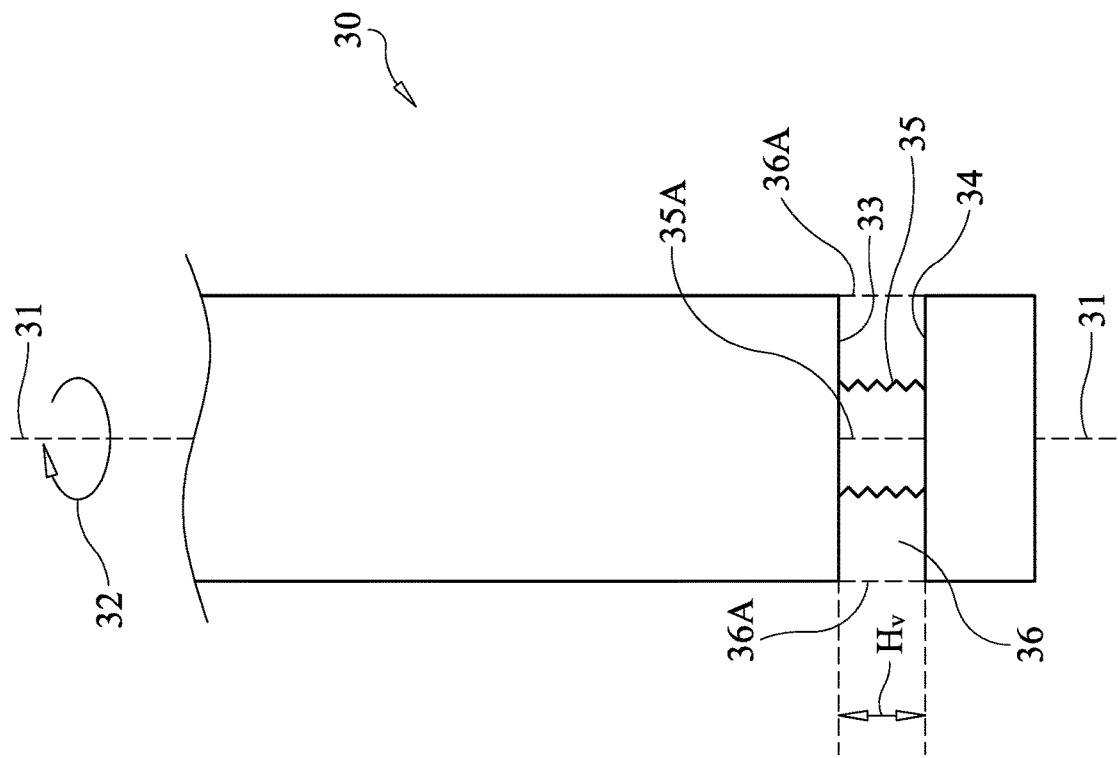
FIG. 2 is an isolated side view of a portion of one embodiment of a friction stir welding (FSW) bobbin pin tool for use in an additive manufacturing system in accordance with various aspects as described herein.
Figure 3:
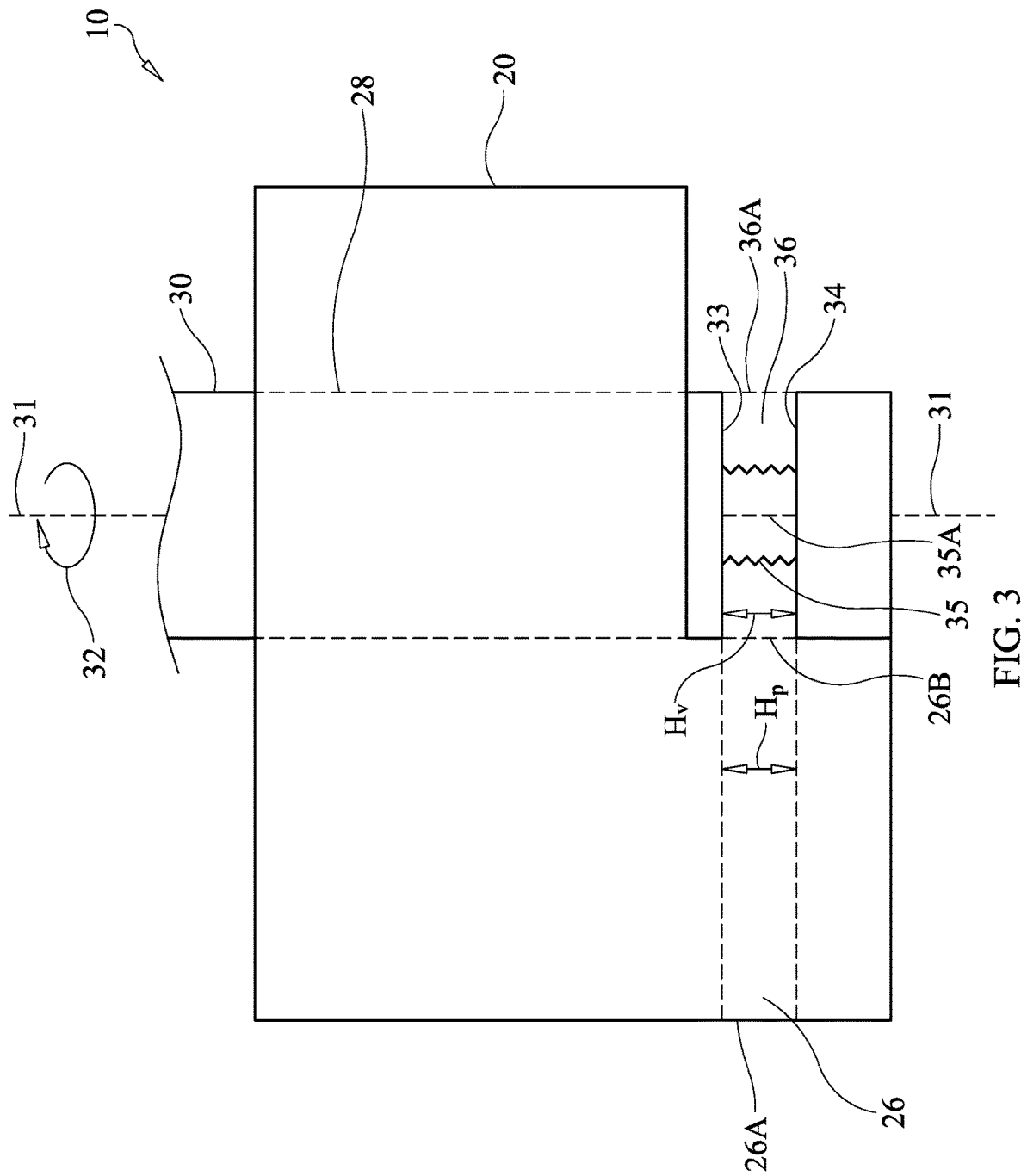
FIG. 3 is a side view of one embodiment of an additive manufacturing system in accordance with various aspects as described herein.

Referring now to the drawings, simultaneous reference will be made to FIGS. 1-3 where an embodiment of an additive manufacturing system in accordance with the present disclosure is illustrated in FIG. 3, and where constituent portions thereof are illustrated in isolation in FIGS. 1 and 2. The additive manufacturing system illustrated in FIG. 3 is referenced generally by numeral 10. As will be explained later herein, system 10 may be used to construct and/or modify structures through an additive manufacturing process that deposits additional/new material onto an existing structure or portion thereof that will hereinafter be referred to simply as a substrate. The substrate as well as the additional/new material may be metals such as, but not limited to aluminum alloys, titanium alloys, steel, or any metal or alloy that lends itself to friction stir welding. The substrate may be a cylindrical wall, a dome-shaped wall, a sinusoidal-shaped wall, or any combination thereof where the fabricated structures may be used, for example, in the construction of aeronautical vehicles, aerospace vehicles, ship hulls, pressure vessels, etc. However, the systems and methods described herein may be used to construct and/or modify a variety of sized/shaped structures without departing from the scope of the present disclosure.

System 10 includes a deposition control housing 20 (shown in an isolated cross-sectional view in FIG. 1) and a friction stir weld (FSW) bobbin pin tool 30 (shown in an isolated side view in FIG. 2). As used herein, the term "FSW bobbin pin tool" includes tools whose bobbin spacing is fixed as well as tools whose bobbin spacing is adjustable in-situ and during use thereof. Such adjustable bobbin pin tools are also referred to in the art as "self-reacting" tools.

Housing 20 is a rigid structure that may be constructed using one or more pieces without departing from the scope of the present disclosure. As is best seen in FIG. 1, housing 20 has a first portion 22 and a second portion 24 adjacent and coupled to first portion 22. First portion 22 has a tubular passageway 26 extending there through such that passageway 26 has a first open end 26A and a second open end 26B. The diametric cross-sectional shape of passageway 26 including the diametric cross-sectional shapes of open ends 26A and 26B may be circular, rectangular, oval, etc., without departing from the scope of the present disclosure. In the illustrated embodiment, passageway 26 is a linear passageway. In some embodiments, the walls 27 of passageway 26 may be coated or otherwise processed to provide a reduced friction surface for reasons to be described later herein. In some embodiments, the cross-sectional area of open end 26B is larger than the cross-sectional area of open end 26A for reasons to be described later herein.

Second portion 24 has a bore 28 extending there through. Bore 28 is configured to receive FSW bobbin pin tool 30 therein such that second portion 24 supports rotation of pin tool 30 about its longitudinal axis 31 as indicated by rotation arrow 32 (as depicted in FIG. 2). Bore 28 may be configured to include features (not shown) that support rotation 32. For example, such features may include, but are not limited to, bearings positioned in/along bore 28, friction-reducing coatings or treatments along bore 28, etc. Pin tool 30 may be coupled to a motorized system (not shown) for purposes of generating rotation 32 as is well known in the art.

Pin tool 30 includes an upper shoulder 33, a lower shoulder 34, and a pin 35 disposed between upper shoulder 33 and lower shoulder 34. More specifically, pin 35 is rigidly coupled to central portions of shoulders 33 and 34 such that shoulders 33 and 34 are spaced apart from one another by a distance "$H_V$" and such that rotation 32 causes shoulders 33/34 and pin 35 to rotate in unison about longitudinal axis 31. The spaced-apart shoulders 33/34 with pin 35 disposed there between results in an annular volume 36 of height $H_V$ being defined about pin 35 and between shoulders 33 and 34. The annular periphery (indicated by dashed lines 36A) of annular volume 36 is open or unbounded. In some embodiments, pin 35 may be threaded as illustrated. In some embodiments, pin tool 30 may be configured for adjustments in height $H_V$ (and, therefore, the size of annular volume 36) during use of system 10 in order to support self-reacting FSW processes. In some embodiments, shoulders 33 and 34 are cylindrical and the longitudinal axis 35A of pin 35 is perpendicular to both shoulders 33 and 34 such that annular volume 36 is cylindrical with its height $H_V$ equal to the length of pin 35.

As illustrated in FIG. 3, pin tool 30 is disposed in bore 28 of housing 20 such that a radial edge of annular periphery 36A is immediately adjacent to open end 26B. In general, the height "$H_P$" of passageway 26 (measured parallel to the longitudinal axis 35A of pin 35) is less than the height $H_V$ of annular volume 36 for reasons that will be explained later herein.

Figure 4:
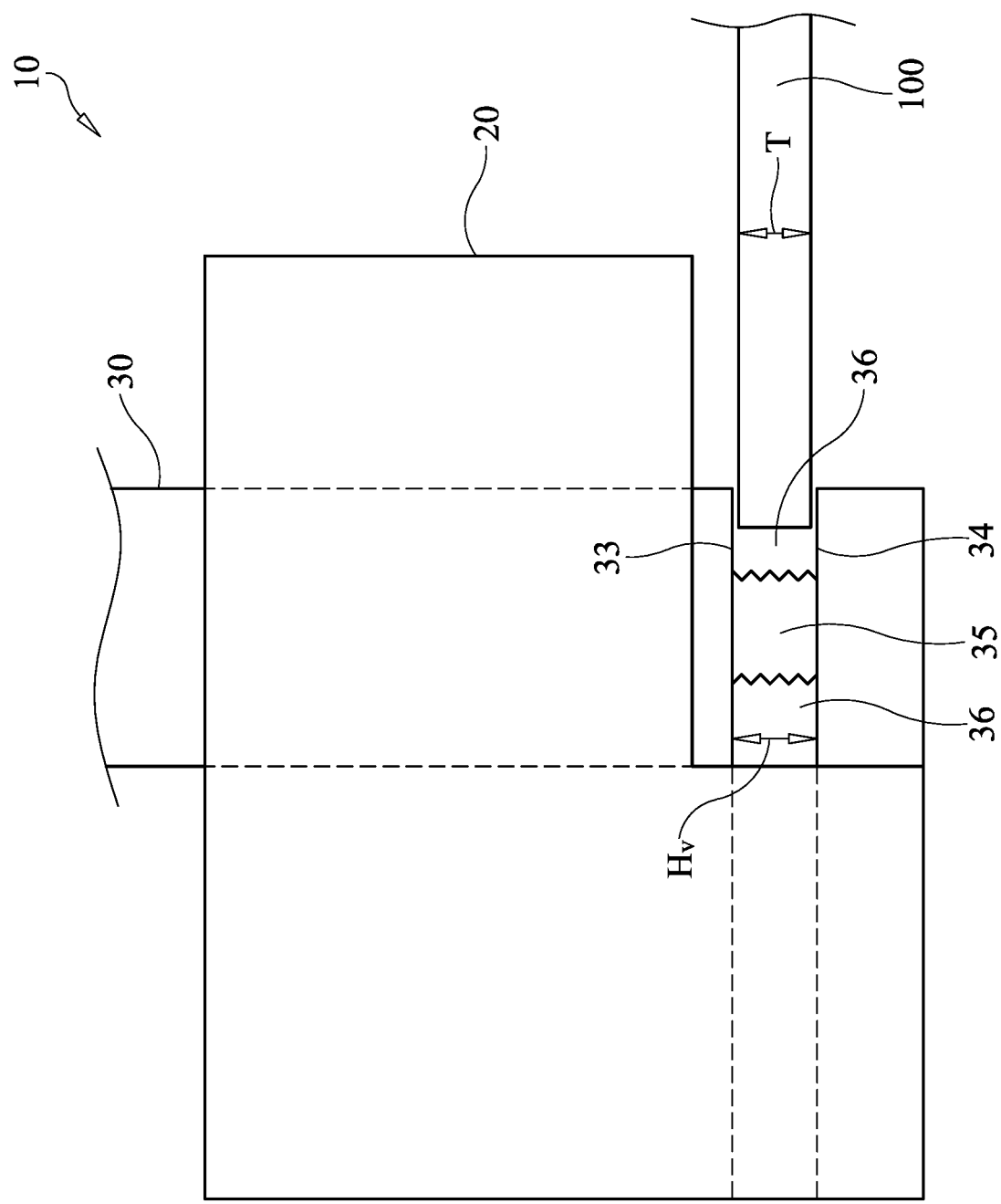
FIG. 4 is a side view of the additive manufacturing system illustrated in FIG. 3 engaging an edge portion of a substrate in accordance with various aspects as described herein.
Figure 6:
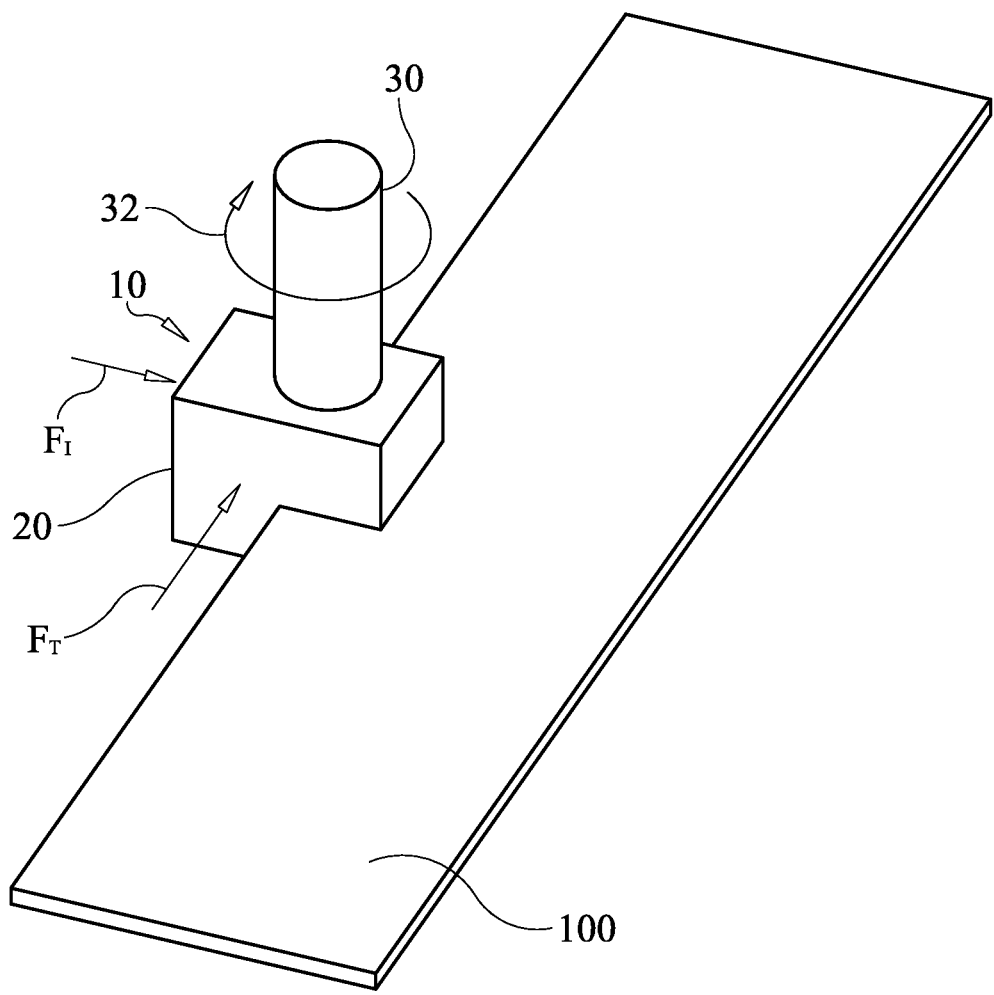
FIG. 6 is a perspective view of the additive manufacturing system illustrated in FIG. 5 engaging the edge portion of the substrate as the system is driven towards and along the substrate's edge portion while the FSW bobbin pin tool is rotated in accordance with various aspects as described herein.

With reference to FIGS. 4-8, an additive manufacturing method using the above-described system 10 will be described. In FIG. 4, system 10 is positioned with its housing 20 adjacent to a solid substrate 100 (e.g., an existing wall structure) such that a portion of substrate 100 is disposed in annular volume 36 of pin tool 30. The height $H_V$ of annular volume 36 is configured to receive the thickness "T" of substrate 100 such that substrate 100 is in contact with shoulders 33 and 34. Next, motive forces are applied to system 10 as depicted in FIGS. 5 and 6. More specifically, pin tool 30 is driven to rotation 32 by a motorized mechanism/system (not shown) as the same or different mechanism/system applies an insertion force "$F_I$" and a translation force "$F_T$" (as shown in FIG. 6) to system 10. Insertion force $F_I$ causes pin 35 to be driven into an edge portion 102 of substrate 100 disposed in annular volume 36. As rotating pin 35 engages edge portion 102 in annular volume 36, the material of edge portion 102 is plasticized. In some embodiments, the translation force Fr is applied to substrate 100. Accordingly, it is to be understood that the method described herein only requires relative translation movement between system 10 and substrate 100.

Figure 7:
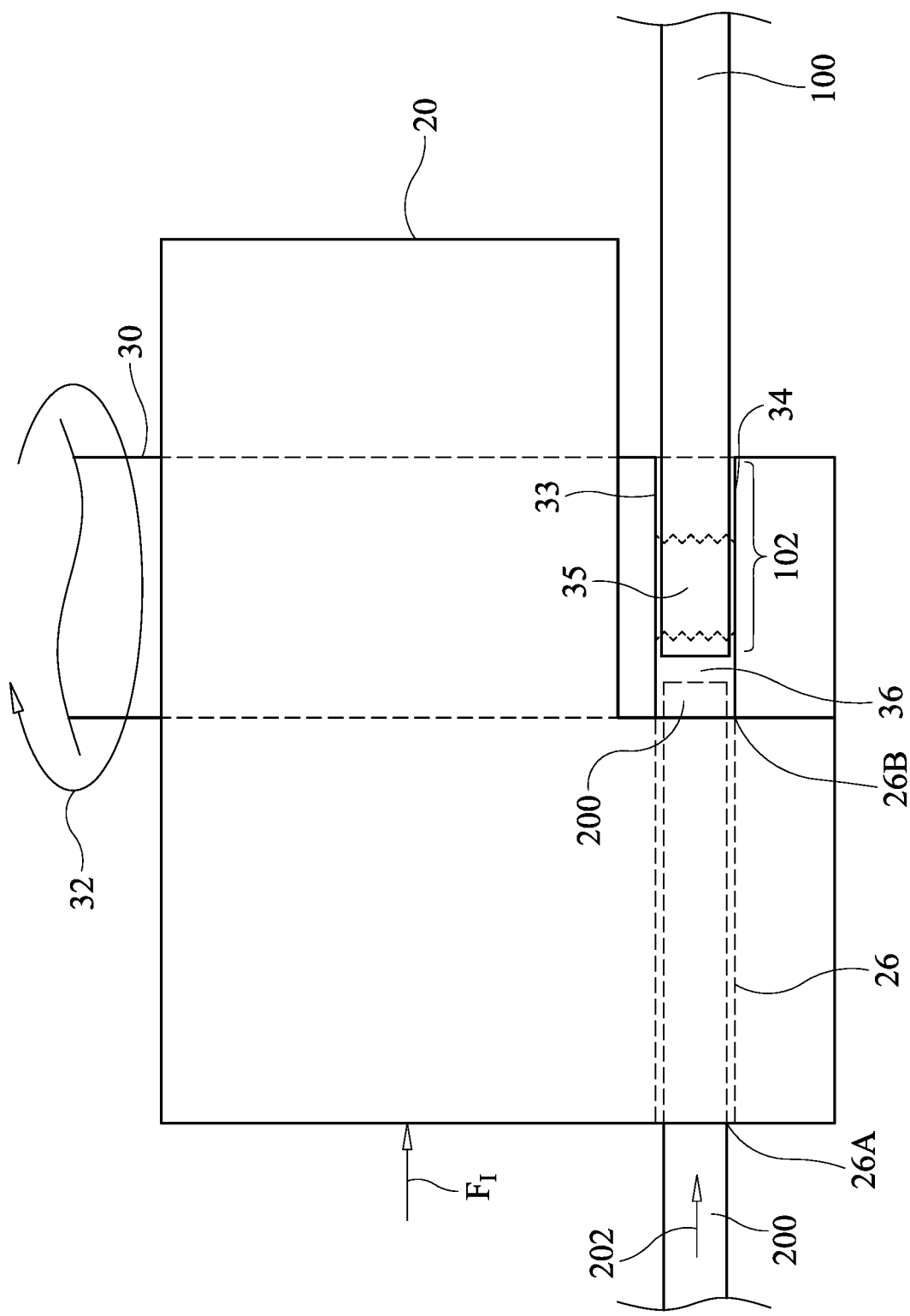
FIG. 7 is a side view of the additive manufacturing system illustrated in FIG. 5 engaging the edge portion of the substrate as the system is driven towards and along the substrate's edge portion while the FSW bobbin pin tool is rotated and as the system is being fed with a material that is to be deposited on the edge portion of the substrate in accordance with various aspects as described herein.

With reference now to FIGS. 7-8, the additive processing is achieved by feeding a material 200 into and through housing 20 using the above-described passageway 26. More specifically, material 200 is fed into the passageway's open end 26A and is pushed along the passageway as indicated by arrow 202 so that material 200 exits housing 20 at open end 26B. In some embodiments, material 200 may be a solid bar, rod, wire, etc. In some embodiments, material 200 may be a powder, or metal chips derived from scrap metal, that is supplied to passageway 26 under pressure. In some embodiments, substrate 100 and material 200 are the same material. In some embodiments, substrate 100 and material 200 are different materials. In all cases, material 200 exits open end 26B and enters annular volume 36 where material 200 is plasticized by rotating pin tool 30. The plasticized material 200 mixes with the plasticized edge portion 102. The resulting mixture is deposited onto the edge of substrate 100 as system 10 has the above-described rotation, insertion, and translation forces applied thereto.

To avoid clogs in system 10 during the additive manufacturing process, system 10 may have one or more of the features mentioned previously herein. For example and as mentioned above, the height $H_P$ of passageway 26 may be less than the height $H_V$ of annular volume 36 to reduce the chance that material 200 will bind or clog when entering annular volume 36. For similar reasons, the walls 27 (FIG. 1) of passageway 26 and/or any surface within housing 20 may be coated, treated, be configured for ultrasonic excitation, etc., for reduced friction with material 200 as it is fed into/through passageway 26 and as plasticized materials are processed in annular volume 36. For similar reasons, the cross-sectional area of open end 26B of passageway 26 may be larger than the cross-sectional area of open end 26A. For example and as illustrated in FIG. 9, passageway 26 may include a flared region 26C that terminates in open end 26B such that open end 26B has a larger cross-sectional area than that of open end 26A. The length and angular flare of flared region 26C are not limitations of the methods and systems described herein. In some embodiments, it may also be desirable to coat, treat, etc., exterior portions of housing 20 that will come into contact with substrate 100 with anti-friction coatings/treatments/configurations for ultrasonic excitation to facilitate the above-described relative translational movement between the housing and the substrate.

The advantages of the systems and methods described herein are numerous. Existing friction stir weld machines may be readily leveraged to construct an additive manufacturing system that may be operated to construct and/or modify walled structures. The system incorporates modularity so it can be configured for additive manufacturing processes or conventional FSW processes with minimal time and expense. The system is adaptable to the fabrication of large walled structures used in the construction of aeronautical and aerospace vehicles, ship or underwater vessel hulls, pressure vessels, etc. The system is also adaptable to the fabrication of build parts of various thicknesses. If needed, the system is readily adapted for water cooling to reduce tool wear, adapted to materials having higher melt temperatures, etc.

Although the methods and systems presented herein have been described for specific embodiments thereof, there are numerous variations and modifications that will be readily apparent to those skilled in the art in light of the above teachings. For example, in some embodiments, the thickness of the edge portion of a substrate and thus the thickness of the resulting deposition on the substrate (i.e., the mixture of the plasticized edge portion and plasticized added material as described above) may necessitate containment of the plasticized mixture. In such cases, the above-described housing 20 may be modified as illustrated in FIG. 10. More specifically, a leading edge portion 29 of housing 20 may be configured to wrap partially around the annular volume (not shown) of pin tool 30 and ride along substrate 100 to prevent the plasticized mixture from flashing ahead of housing 20 as it translates along the edge of substrate 100 as driven by translation force Fr as described above. It is therefore to be understood that, within the scope of the appended claims, the methods and systems presented herein may be practiced other than as specifically described.

What is claimed as new and desired to be secured by Letters Patent of the United States is:

1. An additive manufacturing system, comprising:
    a housing having a passageway extending through a portion of said housing, said passageway having a first open end and a second open end, said first open end adapted to receive a material that is to be fed through said passageway and exit said second open end;
    a friction stir weld (FSW) bobbin pin tool that includes a first shoulder, a second shoulder spaced apart from said first shoulder, and a pin having a longitudinal axis, said pin rigidly coupled to said first shoulder and said second shoulder wherein an annular volume is bounded by said first shoulder, said second shoulder, and said pin;
    said FSW bobbin pin tool mounted in said housing with a radial edge of said annular volume disposed adjacent to said second open end of said passageway;
    said annular volume adapted to receive a substrate; and
    said FSW bobbin pin tool operable to be rotated wherein said first shoulder, said second shoulder, and said pin rotate in unison and about said longitudinal axis of said pin, wherein the substrate and the material exiting said second open end are plasticized in said annular volume.

2. The additive manufacturing system of claim 1, wherein said passageway is linear.

3. The additive manufacturing system of claim 1, wherein said passageway is linear and is perpendicular to said longitudinal axis of said pin.

4. The additive manufacturing system of claim 1, wherein said annular volume is cylindrical.

5. The additive manufacturing system of claim 1, wherein said longitudinal axis of said pin is perpendicular to said first shoulder and said second shoulder.

6. The additive manufacturing system of claim 1, wherein said annular volume has a height commensurate with an axial length of said pin, and wherein a height of said second open end measured parallel to said axial length of said pin does not exceed said height of said annular volume.

7. The additive manufacturing system of claim 1, wherein a cross-sectional area of said second open end is larger than a cross-sectional area of said first open end.

8. An additive manufacturing system, comprising:
    a housing having a first portion and a second portion adjacent to said first portion;
    a passageway extending through said first portion and having a first open end and a second open end, said first open end adapted to receive a material from outside of said first portion that is to be fed through said passageway and exit said first portion at said second open end;
    a friction stir weld (FSW) bobbin pin tool that includes a first shoulder, a second shoulder spaced apart from said first shoulder, and a pin having a longitudinal axis, said pin rigidly coupled to said first shoulder and said second shoulder wherein an annular volume is bounded by said first shoulder, said second shoulder, and said pin, and wherein said annular volume has an annular periphery that is unbounded;

said FSW bobbin pin tool mounted in said second portion of said housing with a portion of said annular periphery disposed adjacent to said second open end of said passageway;

said annular volume adapted to receive a substrate; and said FSW bobbin pin tool operable to be rotated wherein said first shoulder, said second shoulder, and said pin rotate in unison and about said longitudinal axis of said pin, wherein the substrate and the material exiting said second open end are plasticized in said annular volume.

9. The additive manufacturing system of claim 8, wherein said passageway is linear.

10. The additive manufacturing system of claim 8, wherein said passageway is linear and is perpendicular to said longitudinal axis of said pin.

11. The additive manufacturing system of claim 8, wherein said annular volume is cylindrical.

12. The additive manufacturing system of claim 8, wherein said longitudinal axis of said pin is perpendicular to said first shoulder and said second shoulder.

13. The additive manufacturing system of claim 8, wherein said annular volume has a height commensurate with an axial length of said pin, and wherein a height of said second open end measured parallel to said axial length of said pin does not exceed said height of said annular volume.

14. The additive manufacturing system of claim 8, wherein a cross-sectional area of said second open end is larger than a cross-sectional area of said first open end.

15. A method of additive manufacturing, comprising:

by a housing having a passageway extending through a portion of the housing with the passageway having a first open end and a second open end, and a friction stir weld (FSW) bobbin pin tool that includes a first shoulder, a second shoulder spaced apart from the first shoulder, and a pin having a longitudinal axis with the pin rigidly coupled to the first shoulder and the second shoulder wherein an annular volume is bounded by the first shoulder, the second shoulder, and the pin, where the FSW bobbin pin tool is mounted in the housing with a radial edge of the annular volume disposed adjacent to the second open end of the passageway, positioning the housing adjacent to a substrate with an edge portion of the substrate disposed in the annular volume;

rotating the FSW bobbin pin tool wherein the first shoulder, the second shoulder, and the pin rotate in unison and about the longitudinal axis of the pin;

driving the housing and the FSW bobbin pin tool towards the edge portion of the substrate during the step of rotating wherein the pin is plunged into the edge portion of the substrate disposed in the annular volume, and wherein the edge portion of the substrate disposed in the annular volume is plasticized in the annular volume;

generating relative movement between the FSW bobbin tool and the edge portion of the substrate during the steps of rotating and driving; and feeding a material through the passageway from the first open end during the steps of rotating, driving and generating wherein the material exits the second open end and is plasticized in the annular volume, and wherein a mixture of the material so-plasticized and the edge portion of the substrate so-plasticized is deposited onto the substrate at the edge portion of the substrate.

16. The additive manufacturing method of claim 15, wherein the passageway is linear.

17. The additive manufacturing method of claim 15, wherein the passageway is linear and is perpendicular to the longitudinal axis of the pin.

18. The additive manufacturing method of claim 15, wherein the annular volume is cylindrical.

19. The additive manufacturing method of claim 15, wherein the longitudinal axis of the pin is perpendicular to the first shoulder and the second shoulder.

20. The additive manufacturing method of claim 15, wherein the annular volume has a height commensurate with an axial length of the pin, and wherein a height of the second open end measured parallel to the axial length of the pin does not exceed the height of the annular volume.

21. The additive manufacturing method of claim 15, wherein a cross-sectional area of the second open end is larger than a cross-sectional area of the first open end.

22. The additive manufacturing method of claim 15, further comprising adjusting a height of the annular volume during one or more of the steps of rotating, driving, generating, and feeding.

* * * * *